Sept. 28, 1937.  H. KÜPPENBENDER  2,094,072
ROLL FILM CAMERA
Filed April 22, 1937
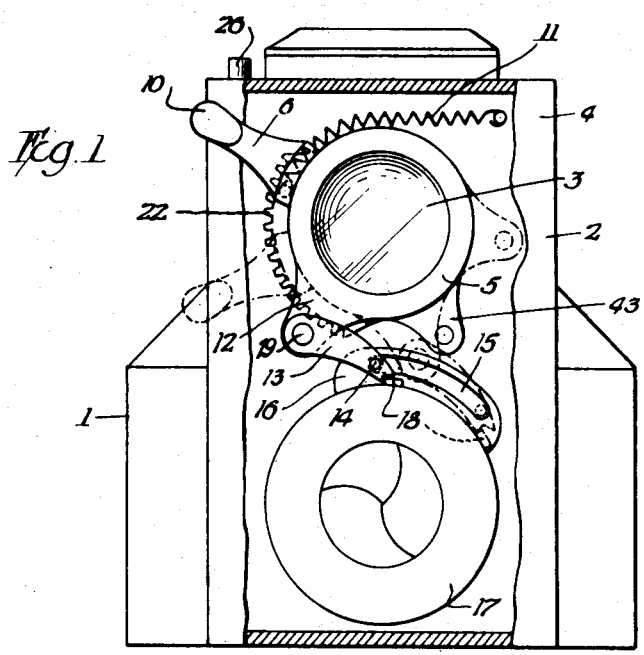
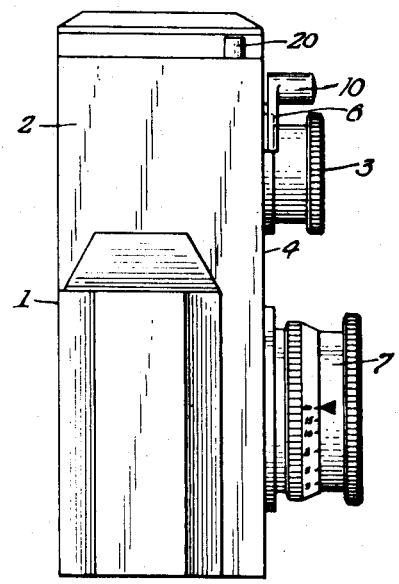
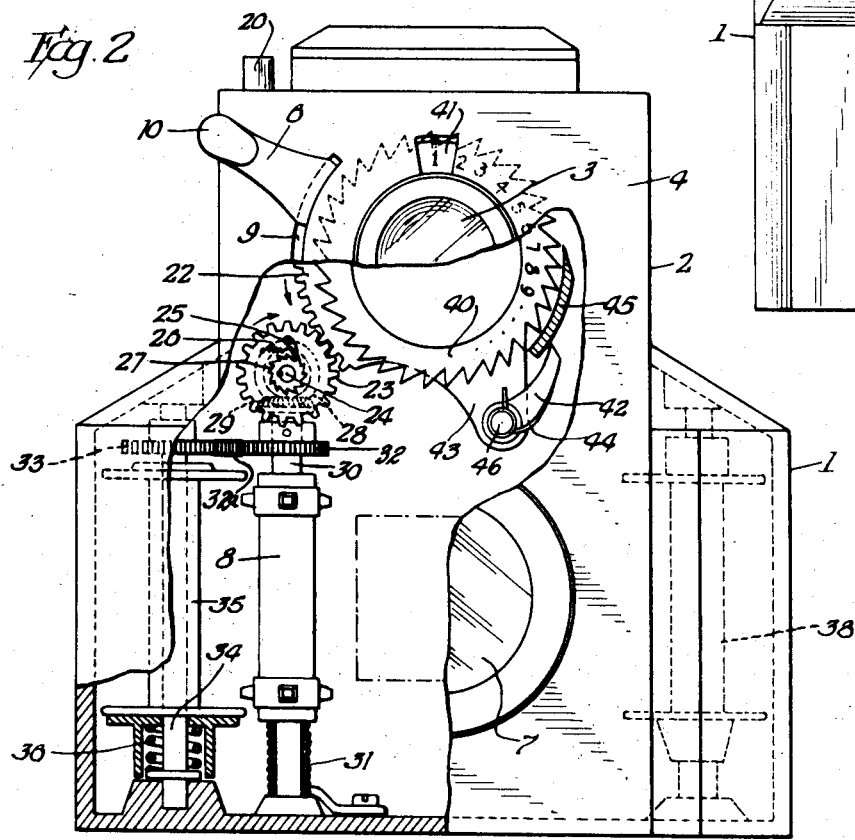
Inventor:
Heinz Küppenbender
by B. Singer
Attorney Patented Sept. 28, 1937

2,094,072

UNITED STATES PATENT OFFICE 2,094,072

ROLL FILM CAMERA

Heinz Küppenbender, Dresden, Germany, assignor to Zeiss Ikon Aktiengesellschaft, Dresden, Germany Application April 22, 1937, Serial No. 138,331
In Germany April 28, 1936

15 Claims. (Cl. 95—31)

The invention relates to improvements in roll-film cameras, and particularly pertains to roll-film cameras equipped with a reflex finder and in which a single member is provided for simultaneously tensioning the shutter and advancing the film.

The principal object of the invention is to increase the readiness of the camera for taking pictures. This is accomplished by arranging the member for tensioning the shutter and advancing the film at such a place that it is no longer necessary, as heretofore, to remove the camera from its picture taking position, which may be in the height of the eyes or the chest, when it is desired to operate the member which prepares the camera for the next exposure.

According to the invention the member for tensioning the shutter and advancing the film comprises an operating lever which projects from the finder compartment arranged in the upper portion of the camera casing. The inner end of the lever is attached to or is integrally formed with a ring which is coaxially mounted with respect to the finder lens. In fact, the ordinarily vacant space around the finder lens within the camera casing is used for accommodating the inner ring-shaped end of the operating lever and other elements connected with the same. Furthermore, it is very simple to arrange at this place the means for tensioning the shutter of the photographic lens system, which lens system is arranged below the finder lens, and also to provide the necessary connections for advancing the film.

It is also an object of the invention to shape and arrange the operating lever for tensioning the shutter and advancing the film in such a manner that it may easily be operated by the middle finger of the right hand when the camera is held by both hands in picture taking position. The index finger of the right hand may then be used to depress the shutter release button, which is arranged adjacent the operating lever, without changing the position of the hand supporting the camera.

Another object of the invention is to provide a counter means operated by said operating lever and indicating the number of exposures made with the camera. This counter means is likewise arranged in the ordinarily vacant space within the camera casing around the finder lens.

The following description with reference to the accompanying drawing given as an example, will cause the manner in which the invention may be carried out to be well understood.

In the drawing:

Fig. 1 illustrates diagrammatically the rollfilm camera in front elevation, with a portion of the front wall broken away, to show the shutter tensioning means.

Fig. 2 is a similar view to Fig. 1 and illustrates in particular the film advancing means and the exposure counting means, and Fig. 3 is a side view of the camera.

In the illustrated embodiment of the invention the camera casing 1 is provided with an upwardly extending portion 2 which forms a separate compartment for a reflex finder. This compartment is provided in its interior in customary manner with means (not shown) for reflecting the finder image into the eyes of the photographer. A finder lens 3 is mounted on the front wall 4 of the casing portion 2. A ring 5 is rotatably mounted within the casing portion 2 coaxially with the finder lens 3. The ring 5 is adapted to be manually rotated by an operating lever 6 for the purpose of tensioning the shutter 17 associated with the photographic lens system 7 and for actuating the film conveying roller 8. The lever 6 is attached or integrally formed with the ring 5. The lever 6 is bent angularly to pass through a curved slot 9 in the front wall 4 of the casing portion 2 and then is bent radially outwardly with respect to the axis of the finder lens 3 and has at its extreme outer end a finger piece 10 adapted to be conveniently engaged by the user of the camera. After each manual operation of the lever 6 it is returned to its initial position, shown in Figs. 1 and 2, by a spring 11.

For tensioning the shutter 17 the ring 5 is provided with a radial extension 12 to which is pivotally attached at 19 a pawl 13. The pawl 13 is guided adjacent its free end by a laterally projecting pin 14 in a curved path which is concentric to the axis of the photographic lens system 7. The pin 14 enters a curved slot 15 in a stationary plate member 16. This slot 15 limits the rotation of the ring 5 in both directions. The free end of the pawl 13 is thus brought into engagement with the shutter tensioning member 18 which projects with its outer end from the circumference of the shutter 17. Upon depression of the operating lever 6, and moving it from the position shown in full lines in Fig. 1 to the position indicated in dash-dotted lines the shutter 17 is tensioned. After the lever 6 has returned to its initial position, due to the action of the spring 11, the shutter 17 may be released by depressing the button 20 projecting from the top wall of the casing portion 2 and arranged adjacent the finger piece 10 of the lever 6.

The actuation of the film advancing mechanism by the operating lever 6 and its associated ring 5 is illustrated particularly in Fig. 2. There is arranged coaxially with the ring 5 and rotatable with the same a toothed segment 22 engaging a gear 23 mounted rotatably on a horizontal shaft 24. A pawl 25 pivotally secured on the gear 23 is urged by a spring 26 in engagement with a ratchet wheel 27 to rotate the same in one direction only, namely when the lever 6 is manually depressed. The ratchet wheel 27 is fixedly secured to the shaft 24 which has also secured thereon the bevel gear 28 meshing with a bevel gear 29 on a vertical shaft 30. This shaft 30 has the film conveying roller 8 fixed thereto. The lower end of the vertical shaft 30 has a spring 31 applied thereto which prevents a reverse rotation of the roller 8 when the operating lever 6 and therewith the gearing 22, 23 returns to initial position.

The shaft 30 is connected by gears 32, 32a and 33 with the shaft 34 on which the film take-up spool 35 is rotatably mounted. The spool 35 is driven by the shaft 34 by the intermediary of a friction clutch 36. Whenever the operating lever 6 is depressed the film conveying roller 8 is set in motion to unwind the film from the supply spool 38 and to drive the spool 35 upon which the film is to be wound.

The Fig. 2 illustrates also a counting device which indicates the number of exposures taken with the camera. This counting device includes a toothed annular disc 40 mounted rotatably within the casing portion 2 coaxial with the finder lens 3 and directly adjacent the inner face of the front wall 4. The forward directed face of the annular disc 40 is provided with a series of numbers or the like, indicating exposures. One of these numbers at the time is made visible through a window opening 41 in the wall 4, preferably just above the finder lens 3 as shown in Fig. 2. The disc 40 is rotated step by step by a pawl 42 whenever the operating lever 6 is manually operated to tension the shutter and to advance the film one complete picture area. This pawl 42 is pivotally attached at 46 to a radial projection 43 of the ring 5 and by a spring 44 is urged in a directimon toward the toothed circumference of the disc 40. The pawl 43 normally rests with its disc-enaging end upon a stationary cam member 45 concentric with the disc 40. Only during the last portion of the downward movement of the operating lever 6 the pawl 43 leaves the cam member 45 and engages the toothed circumference of the disc 40 to rotate the latter one step so that the next number will appear in the window opening 41.

The operation of the camera of the invention, as far as the tensioning of the shutter, the advancement of the film and the release of the shutter are concerned is believed to be obvious. All these operations can be accomplished while the camera is held in both hands and faces the object to be photographed, ready for taking the picture. By depressing the lever 6 with the middle finger of the right hand the shutter is tensioned and simultaneously therewith the film is advanced. Then by depressing the button 20 with the index finger the shutter is released and the exposure is made. In this manner a number of pictures may be taken in quick succession, one after the other without removing the camera from its operative position.

What I claim as my invention is:

1. In a roll film camera, a camera casing provided with a separate finder compartment and a finder lens; a photographic lens system mounted on said camera casing below said finder lens, a shutter associated with said photographic lens system, means for advancing the film, and manually operable means arranged coaxially with said finder lens for tensioning said shutter and actuating said film advancing means simultaneously.

2. In a rollfilm camera, a camera casing provided with a separate finder compartment and a finder lens; a photographic lens system mounted on said camera casing, a shutter associated with said photographic lens system, and manually operable means arranged coaxially with said finder lens for tensioning said shutter.

3. In a rollfilm camera, a camera casing provided with a separate finder compartment and a finder lens; a photographic lens system mounted on said camera casing, means for advancing the film past said photographic lens system, and manually operable means arranged coaxially with said finder lens for actuating said film advancing means.

4. In a rollfilm camera, a camera casing provided with a separate finder compartment and a finder lens; a photographic lens system mounted on said camera casing, a shutter associated with said photographic lens system, means for advancing the film, and manually operable means arranged coaxially with said finder lens for tensioning said shutter and actuating said film advancing means simultaneously.

5. In a rollfilm camera, a camera casing provided with a separate finder compartment and a finder lens; a photographic lens system mounted on said camera casing, a shutter associated with said photographic lens system, means for advancing the film, manually operable means arranged coaxially with said finder lens for tensioning said shutter and actuating said film advancing means simultaneously, and spring means for automatically returning said operable means to initial position after each manual operation.

6. In a rollfilm camera, a camera casing provided with a separate finder compartment and a finder lens; a photographic lens system mounted on said camera casing, a shutter associated with said photographic lens system, means for advancing the film, manually operable means arranged coaxially with said finder lens for tensioning said shutter and actuating said film advancing means simultaneously, spring means for automatically returning said manually operable means to initial position after each manual operation, and means indicating the number of exposures made on the film arranged coaxially with said finder lens and operated by said manually operable means.

7. In a rollfilm camera, a camera casing provided with a separate finder compartment and a finder lens; a photographic lens system mounted on said camera casing, a shutter associated with said photographic lens system, means for advancing the film, manually operable means arranged coaxially with said finder lens for tensioning said shutter and actuating said film advancing means, simultaneously, spring means for automatically returning said manually operable means to initial position after each manual operation, and means indicating the numbers of exposures on the film, said last named means being operated by said manually operable means.

8. In a rollfilm camera, a camera casing provided with a separate finder compartment and a finder lens; a photographic lens system mounted on said camera casing, a shutter associated with said photographic lens system, means for advancing the film, manually operable means arranged coaxially with said finder lens for tensioning said shutter and actuating said film advancing means simultaneously, spring means for automatically returning said manually operable means to initial position after each manual operation, and means indicating the numbers of exposures on the film, said last named means being operated by said manually operable means whenever the same is manually operated for tensioning the shutter and advancing the film.

9. In a rollfilm camera, a camera casing provided with a separate finder compartment and a finder lens; a photographic lens system mounted on said camera casing, a shutter associated with said photographic lens system, said shutter being provided with a member for tensioning the same, a manually rotatable annular member arranged coaxially with said finder lens, a pawl pivoted to said annular member and adapted to engage said shutter tensioning member and move the same into operative position when said annular member is manually rotated, means for guiding said pawl into engagement with said shutter tensioning member, said guiding means limiting the rotative movement of said annular member in both directions, and spring means for automatically returning said annular member to initial position.

10. In a rollfilm camera, a camera casing provided with a separate finder compartment and a finder lens; a photographic lens system mounted on said camera casing, a shutter associated with said photographic lens system, said shutter being provided with a member for tensioning the same, a manually rotatable annular member arranged coaxially with said finder lens, a pawl pivoted to said annular member and adapted to engage said shutter tensioning member and move the same into operative position when said annular member is manually rotated, and spring means for automatically returning said annular member to initial position.

11. In a rollfilm camera, a camera casing provided with a separate finder compartment and a finder lens; a photographic lens system mounted on said camera casing, a shutter associated with said photographic lens system, said shutter being provided with a member for tensioning the same, a manually rotatable annular member arranged coaxially with said finder lens, an outwardly extending operating arm fixedly attached to said annular member, a pawl pivoted to said annular member and adapted to engage said shutter tensioning member and move the same into operative position when said annular member is manually rotated, means for guiding said pawl into engagement with said shutter tensioning member, said guiding means limiting the rotative movement of said annular member in both directions, and spring means for automatically returning said annular member to initial position.

12. In a rollfilm camera, a camera casing provided with a separate finder compartment and a finder lens, a photographic lens system mounted on said camera casing, means for advancing the film past said photographic lens system, a manually rotatable annular member arranged coaxially with said finder lens, a gearing driven by said annular member and operatively connected with said film advancing means for actuating the same when said annular member is manually rotated in one direction, spring means for automatically returning said annular member to initial position, and means for preventing operation of said film advancing means when said annular member is returned to initial position.

13. In a rollfilm camera, a camera casing provided with a separate finder compartment and a finder lens; a photographic lens system mounted on said camera casing, a shutter associated with said lens system, means for tensioning said shutter, means for advancing the film, a rotatable annular member arranged coaxially with said finder lens and provided with an outwardly extending operating arm for manual rotation of said annular member, a pawl pivotally secured to said annular member and guided to engage said shutter tensioning means and actuate the same when said annular member is rotated manually in one direction, a gearing driven by said annular member and operatively connected with said film advancing means for actuating the same when the shutter is tensioning by said annular member, spring means for automatically returning said manually rotatable annular member to its initial position, and means for preventing operation of said film advancing means when said annular member is returned to said initial position.

14. In a rollfilm camera, a camera casing provided with a separate finder compartment and a finder lens; a photographic lens system mounted on said camera casing, a shutter associated with said lens system, means for tensioning said shutter, means for releasing said shutter, means for advancing the film, a rotatable annular member arranged coaxially with said finder lens and provided with an outwardly extending operating arm for manual rotation of said annular member, said lever arm in its normal initial position being positioned adjacent said shutter release means, a pawl pivotally secured to said annular member and guiding to engage said shutter tensioning means to actuate the same when said annular member is rotated manually in one direction, a gearing driven by said annular member and operatively connected with said film advancing means for actuating the same when the shutter is tensioning by said annular member, spring means for automatically returning said manually rotatable annular member to its initial position, and means for preventing operation of said film advancing means when said annular member is returned to said initial position.

15. In a rollfilm camera, a camera casing provided with a separate finder compartment and a finder lens; a photographic lens system mounted on said camera casing, a shutter associated with said photographic lens system, means for advancing the film, manually operable means arranged coaxially with said finder lens for tensioning said shutter and actuating said film advancing means simultaneously, spring means for automatically returning said operable means to initial position after each manual operation, and means indicating the numbers of exposures on the film, said last named means being operated by said manually operable means, and including an annular member provided with numbers and arranged within said finder compartment coaxially with said finder lens, one of said numbers becoming visible at the time through a window arranged adjacent said finder lens.

HEINZ KÜPPENBENDER.